Dec. 7, 1971   N. P. MERCKES   3,624,950
WEIGHT INSERTS FOR BAIT FISH
Filed Oct. 17, 1969

INVENTOR
NICOLAS P. MERCKES
BY GERALD P. WELCH
ATTORNEY

United States Patent Office

3,624,950
Patented Dec. 7, 1971

3,624,950
WEIGHT INSERTS FOR BAIT FISH
Nicholas P. Merckes, % L. Balzer, 3409 S. Whitnall Ave.,
Milwaukee, Wis. 53207
Filed Oct. 17, 1969, Ser. No. 867,147
Int. Cl. A01k 83/06
U.S. Cl. 43—44.2                                          1 Claim

ABSTRACT OF THE DISCLOSURE

A weighted insert for bait fish having an external angular projection apertured to be threaded on the fish line leader between the swivel and the hook or hook gang, said insert having a plurality of exterior barb points disposed toward said angular projection.

BACKGROUND OF THE INVENTION

It is a common and well-known practice to use live fish baits in fishing, such as minnows or chubs, and the larger the fish which the fisherman desires to catch, the greater the size of the live fish bait. An object of the present invention is to weight the bait fish with a lead or other insert which is slidably engaged on the leader for convenient insertion of the weight into the bait fish and convenient insertion of the hook into the latter.

SUMMARY OF THE INVENTION

The invention resides not only in the three forms of weighted inserts, but in the combination of a weighted insert provided with an angular projection which is apertured so that it is threaded on the leader between the swivel and the hook or hook gang or gangs. It is thus movable along the leader for easy insertion into the bait fish and also for convenient insert of the hook into said bait fish.

DESCRIPTION OF THE PREFERRED EMBODIMENTS

Figure 1:
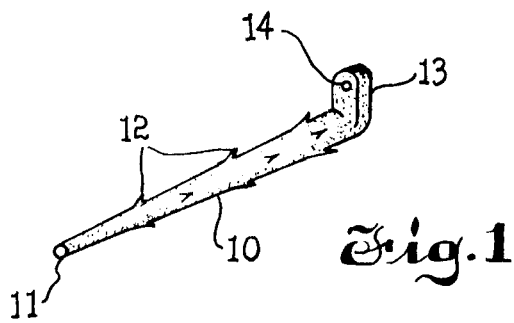
FIG. 1 is a view in perspective of one form of the invention, comprising a molded lead insert.
Figure 2:
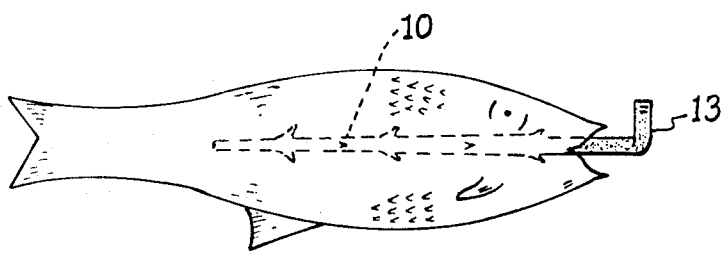
FIG. 2 is a diagrammatic view of a fish with broken lines showing the position of the insert after placement.
Figure 3:
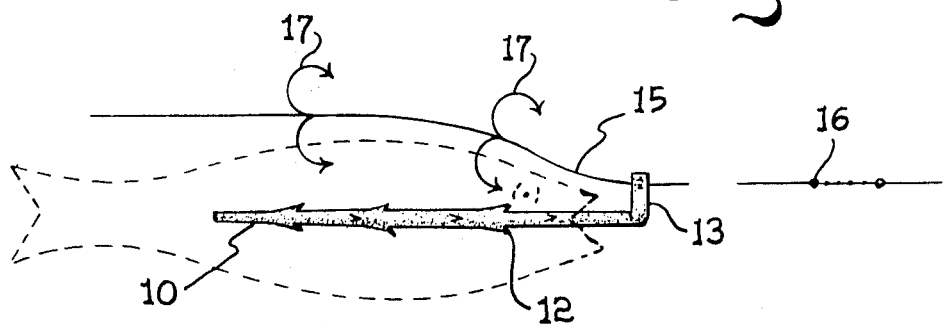
FIG. 3 shows the lead insert threaded on the leader, and hooks of a plurality of hook gangs embedded in the back of a bait fish which latter is shown in broken lines.

As shown in FIG. 1, one form of the device is molded of lead tapered reducedly on the body portion 10 to the insert point 11. The body portion 10 has a plurality of spaced barbs 12 inclined in the direction of the integral angular portion 13 which is apertured at 14 so that a fish line leader 15 may be threaded therethrough.

Figure 4:
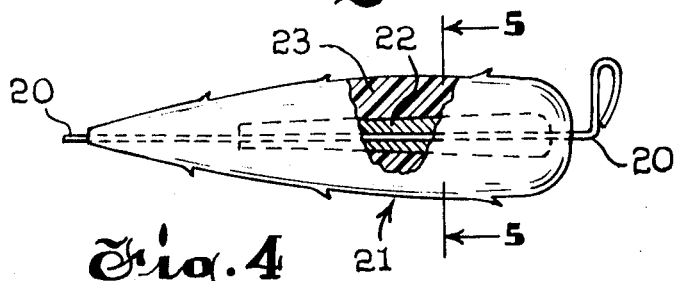
FIG. 4 is a view partly in elevation and partly in section of a large lure for deep sea fishing using large bait.
Figure 5:
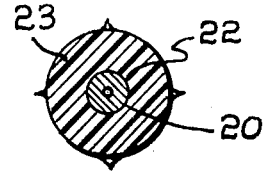
FIG. 5 is a cross-sectional view taken on line 5—5 of FIG. 4.

A modified form of the invention is shown in FIG. 4, wherein a wire 20 extends centrally longitudinally of the lure 21, and a core 22 of lead is molded about said wire, and the whole is covered by relatively large amount of a plastic material 23. The wire 20 terminates frontally in a loop 24 angularly upwardly disposed to engage the fish line leader.

Figure 6:
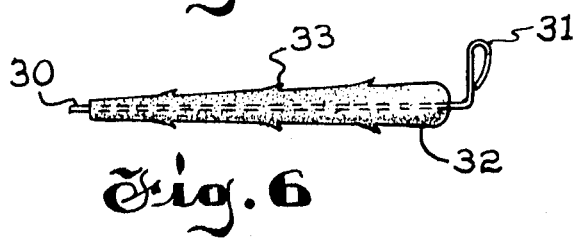
FIG. 6 is a side view in elevation of a modified form of the invention using lead molded on a wire core.

Another modification of the invention is shown in FIG. 6, in which a longitudinal wire element 30 terminates frontally in a loop 31, with the body portion of the wire 30 covered with a tapered molded lead form 32 provided with a plurality of barbs 33.

In use, the device 10 will normally be threaded on the fish line leader 15 through aperture 14 in the angular projection 15, between the swivel 16 and the hook elements 17.

The device 10 may then conveniently be moved away from the hook and may be inserted into the fish 18, and then moved back toward the hooks 17 to fasten the latter into the body of the fish. The bait fish is then in a good position for control of the fishing rod by the hand movements of the fisherman. The other modifications of the invention may be similarly employed.

Having thus described the invention, what is claimed and desired to be secured by Letters Patent of the United States, is:

1. A weight insert for live bait fish including a central longitudinal wire terminating frontally in an angularly disposed eye, a molded lead core embracing said wire, an external plastic body encircling said lead core, and pluralities of molded barbs spaced exteriorly on said plastic body and inclined toward the eye end of said wire.

References Cited
UNITED STATES PATENTS

| | | | |
|---|---|---|---|
| 2,476,126 | 7/1949 | Weiss | 43—41 X |
| 2,836,922 | 6/1958 | Cox | 43—44.2 |
| 2,776,518 | 1/1957 | Felmlee | 43—42.36 X |
| 3,070,917 | 1/1963 | Rowe, Sr. | 43—42.36 X |

FOREIGN PATENTS

| | | |
|---|---|---|
| 994,420 | 11/1951 | France. |
| 666,742 | 2/1952 | Great Britain. |

HUGH R. CHAMBLEE, Primary Examiner